United States Patent [19]
Streib et al.

[11] Patent Number: 5,474,507
[45] Date of Patent: Dec. 12, 1995

[54] METHOD AND ARRANGEMENT FOR ACTUATING AN AUTOMATIC TRANSMISSION OF A MOTOR VEHICLE

[75] Inventors: Martin Streib, Vaihingen; Hong Zhang, Schwieberdingen, both of Germany

[73] Assignee: Robert Bosch GmbH, Stuttgart, Germany

[21] Appl. No.: 299,366

[22] Filed: Sep. 1, 1994

[30] Foreign Application Priority Data

Sep. 4, 1993 [DE] Germany ............................ 43 29 908.3

[51] Int. Cl.$^6$ .............................. B60K 41/06; F16H 59/14
[52] U.S. Cl. ................................................................ 477/129
[58] Field of Search ........................................... 477/128, 129

[56] References Cited

U.S. PATENT DOCUMENTS

| | | | |
|---|---|---|---|
| 4,208,929 | 6/1980 | Heino et al. | 477/129 |
| 4,838,125 | 6/1989 | Hamano et al. | 477/129 |
| 5,239,896 | 8/1993 | Otsubo et al. | 477/129 |

OTHER PUBLICATIONS

"Bosch Technische Berichte", vol. 7 (1983) No. 4, pp. 160 to 166.

*Primary Examiner*—Dirk Wright
*Attorney, Agent, or Firm*—Walter Ottesen

[57] ABSTRACT

The invention proceeds from an automatic transmission wherein upshift and downshift operations are triggered in dependence upon first and second signals for adjusting transmission ratios. The first signal is representative of the transmission output rpm and/or the engine rpm and/or the transmission input rpm and the second signal is representative of the driver command. These upshift and downshift operations take place with a hysteresis which is typical for the particular upshift and downshift operation. According to the invention, the hysteresis has a time-dependent component. Thus, a time-dependent hysteresis is defined in addition to the hysteresis mentioned above which is a basic hysteresis between upshifting and downshifting. The time-independent basic hysteresis can then be selected to be very small for adjusting the gear optimal for the particular operating condition. This affords the advantage that, for example, after an upshift, the load threshold for a pendular downshift into the previous gear is increased for a short time or, after an upshift, the load threshold for a pendular upshift into the previous gear is reduced for a short time.

10 Claims, 6 Drawing Sheets

METHOD AND ARRANGEMENT FOR ACTUATING AN AUTOMATIC TRANSMISSION OF A MOTOR VEHICLE

BACKGROUND OF THE INVENTION

A shift operation of an automatic transmission of a motor vehicle having an electronic control is generally triggered, at a given road speed of the vehicle, when a load command exceeds or drops below a threshold value. The load command is given by the driver by means of an accelerator pedal.

The engine load, for example, constitutes a load command as described in the publication "Bosch Technische Berichte", Volume 7, (1983), Number 4, pages 160 to 166. The engine load can be determined from the opening of the throttle flap. In these systems, this throttle flap opening is pregiven by an accelerator pedal actuated by the driver. The output rpm of the transmission (transmission output rpm) is used, as a rule, as the read speed of the motor vehicle.

Furthermore, and as described in United States patent application Ser. No. 08/050,085, filed Apr. 28, 1993, now abandoned, an engine torque desired value or an output torque desired value can constitute the load command and is derived from the position of the accelerator pedal.

In transmission control systems, if shifting between the third and fourth gear is considered, when a downshift from fourth gear into third gear takes place when the load command expressed by the driver is greater than an upper threshold value. In contrast, an upshift from third gear into fourth gear takes place when the load command of the driver is less than a lower threshold value. These threshold values are dependent upon the road speed of the vehicle. For a fixed speed, it always applies that the threshold for determining an upshift is less than the threshold for determining a downshift. The differences between these two thresholds for a shifting operation (in this example, between the third and fourth gears) defines the so-called shift hysteresis.

There is a clearly determinable gear which is optimal as to consumption for most operating conditions. A hysteresis in the shift characteristic lines means, however, that this consumption-optimal gear is not always selected. For this reason, it would be purposeful to attempt to achieve a small hysteresis. This, however, would have as a consequence that even very small back and forth movements of the accelerator pedal would cause so-called pendular shifting. If these pendular shifts take place within short time intervals, then these shifts are especially disturbing and act negatively on the wear of the transmission (friction elements defining the clutch) and with respect to driving comfort.

SUMMARY OF THE INVENTION

It is an object of the invention to provide a transmission control which makes possible the selection of the gear optimal to the particular operating condition without the above-mentioned pendular shifting occurring.

The invention proceeds from an automatic transmission wherein upshift and downshift operations are triggered in dependence upon at least a first signal and a second signal. The first signal represents the transmission output rpm and/or the engine rpm and/or the transmission input rpm and the second signal represents the driver command for adjusting transmission ratios. These upshift and downshift operations take place with a hysteresis typical for the particular upshift and downshift operation.

According to the invention, the hysteresis has a time-dependent component. Accordingly, the time-dependent hysteresis is defined in addition to a basic hysteresis described above between upshifting and downshifting. The basic hysteresis which is independent of time call then be selected very small for selecting the gear optimal for the particular operating condition. This affords the advantage that, for example, after an upshift, the load threshold for a pendular downshift into the previous gear is increased for a short time or after a downshift, the load threshold is lowered for a pendular upshift into the old gear for a short time.

The time-dependent component of hysteresis advantageously increases the hysteresis compared to the basic hysteresis during a pregiven time interval starting with a shifting operation. The increase of hysteresis then reduces advantageously within the time interval.

This can be obtained in that the shift hysteresis exhibits a steady-state, time-independent component in addition to the time-dependent component.

A configuration of the invention provides that the time-dependent component is superposed additively on the steady-state component for forming the hysteresis. Furthermore, the time-dependent component can be superposed multiplicatively on the steady-state component for forming the hysteresis. In both cases, the time-dependent component is an amount which reduces as a function of time within the time interval. The time interval, as mentioned above, starts approximately with the shifting operation. After the time interval has elapsed, the time-dependent component advantageously goes back to the value zero so that after this time has elapsed, only the steady-state small hysteresis component remains.

As explained above, as the load command of the driver, the following can be utilized: the accelerator pedal position and/or the throttle flap opening angle and/or an output torque at the transmission wanted by the driver or a propelling torque acting on the motor vehicle and wanted by the driver.

The invention also relates to an arrangement for carrying out the above-described method.

BRIEF DESCRIPTION OF THE DRAWING

The invention will now be described with reference to the drawings wherein.

DESCRIPTION OF THE PREFERRED EMBODIMENTS OF THE INVENTION

Figure 1:
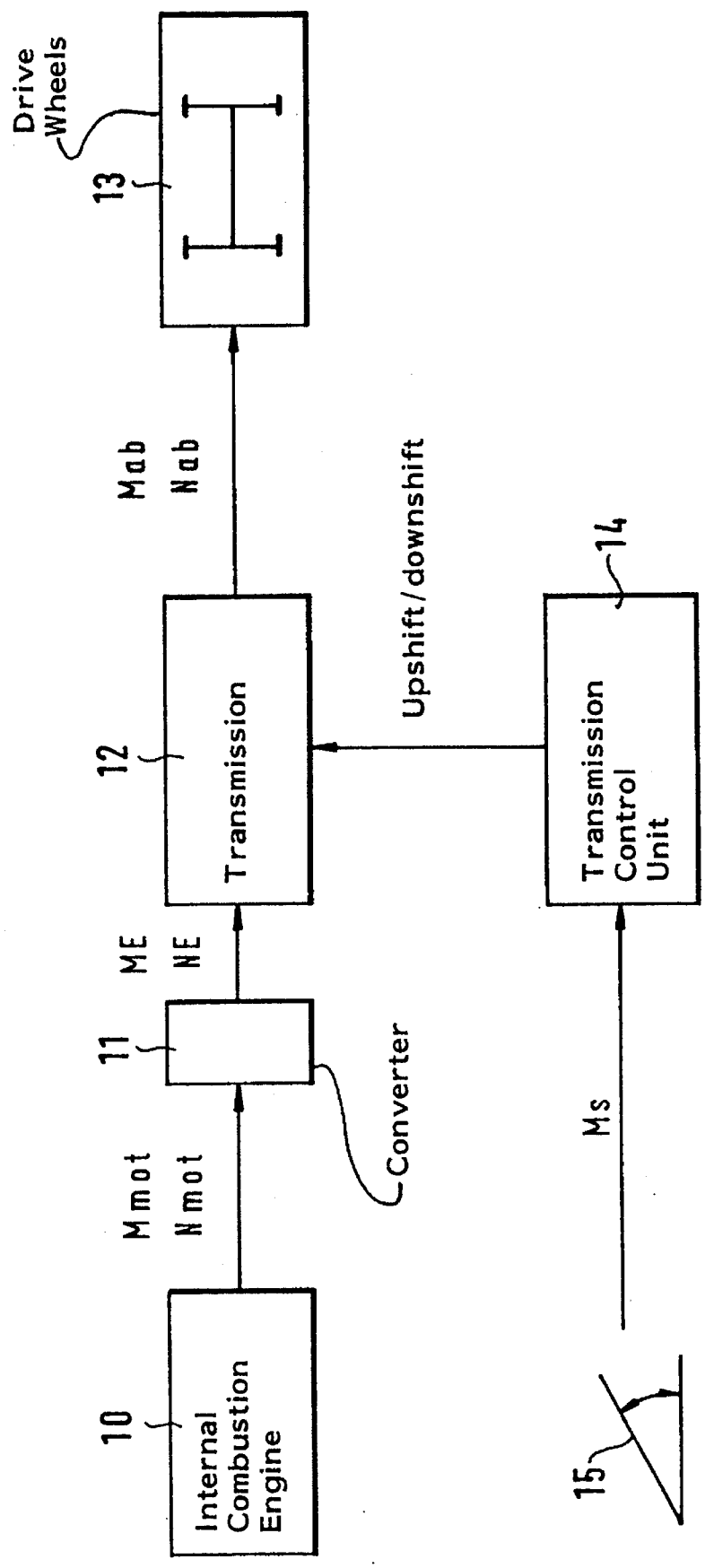
FIG. 1 is a block circuit diagram of the overall system according to the invention.

The block circuit diagram of FIG. 1 shows an overview of an electric transmission control pursuant to the invention. The internal combustion engine 10 supplies an engine rpm Nmot or an engine torque Mmot to the converter 11. A transmission input rpm NE and a transmission input torque ME are present at the transmission 12 at the turbine end of the converter 11. The transmission control 14 controls upshift and downshift operations of the transmission 12 in dependence upon the load command Ms pregiven by the driver via the accelerator pedal 15. The transmission output rpm Nab and the transmission output torque Mab are present at the output end of the transmission 12. The transmission output torque Mab is supplied to the driven wheels 13 of the motor vehicle.

Figure 2:
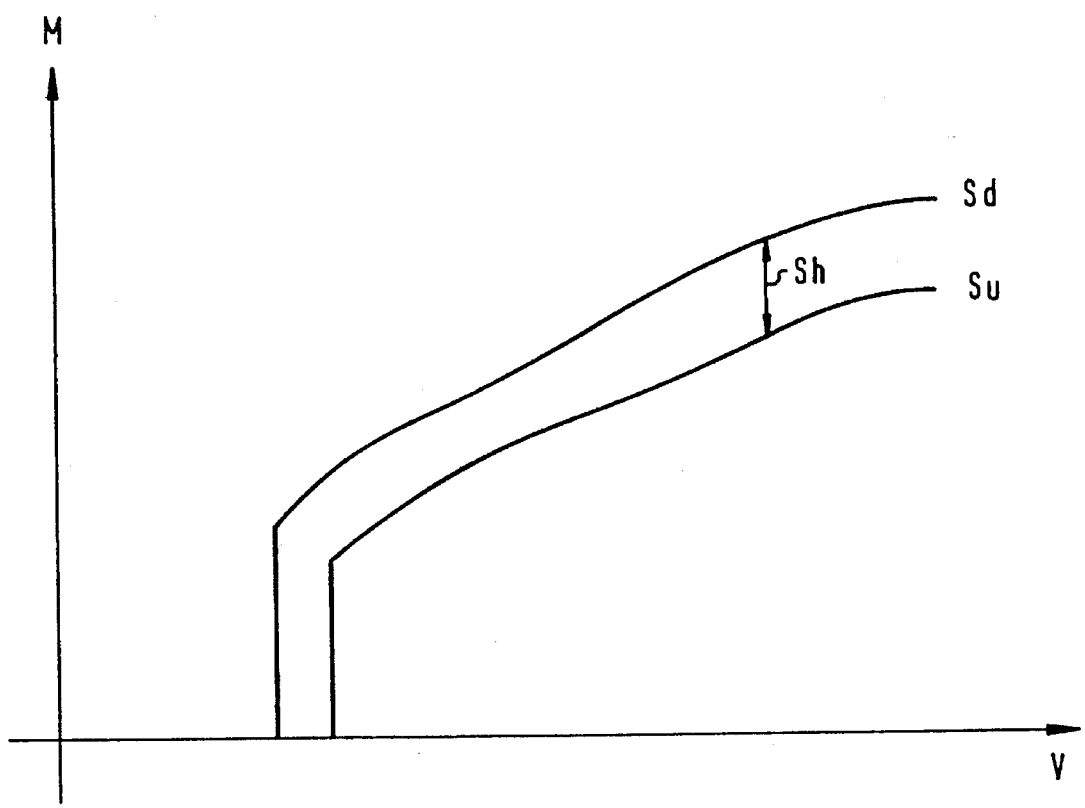
FIG. 2 is a graph showing the driver command M as a function of the road speed V of the motor vehicle.

In FIG. 2, the driver command M is plotted as a function of motor vehicle speed V. Each point on this plane represents a specific driving condition. The load command Ms pregiven by the driver is compared to the threshold values Sd and Su for a then-present motor vehicle speed V in order to detect upshift or downshift operations. An upshift takes place when the load command Ns issued by the driver is less than the lower threshold Su. A downshift takes place when the load command Ms expressed by the driver is greater than the upper threshold value Sd. The thresholds shown in FIG. 2 apply only for shifting between two gear stages. Such a pair of threshold values is assigned to each possible shift between the individual gear stages of the automatic transmission.

For a fixed motor vehicle speed, the threshold Su is always less than the threshold Sd. The difference $$Sd-Su=Sh$$

forms the so-called shift hysteresis Sh.

This shift hysteresis Sh assumes a fixed steady-state value for each gear change with respect to transmission controls according to the state of the art. Such a steady-state shift hysteresis according to the state of the art must be selected adequately large so that so-called pendular shifting is prevented for small back-and-forth movements of the accelerator pedal. As mentioned, this has the disadvantage that the consumption-optimal gear which is clearly determined for a specific operating condition, cannot always be selected.

According to the invention, a time-dependent hysteresis Sz(t) is now defined in addition to the time-independent steady-state basic hysteresis Sh between upshifting and downshifting. This time-dependent hysteresis has the task to increase the load threshold for a pendular downshift into the previous gear for a short time after an upshift or, after a downshift, to lower the load threshold for a short time for a pendular upshift into the previous gear.

Figure 3:
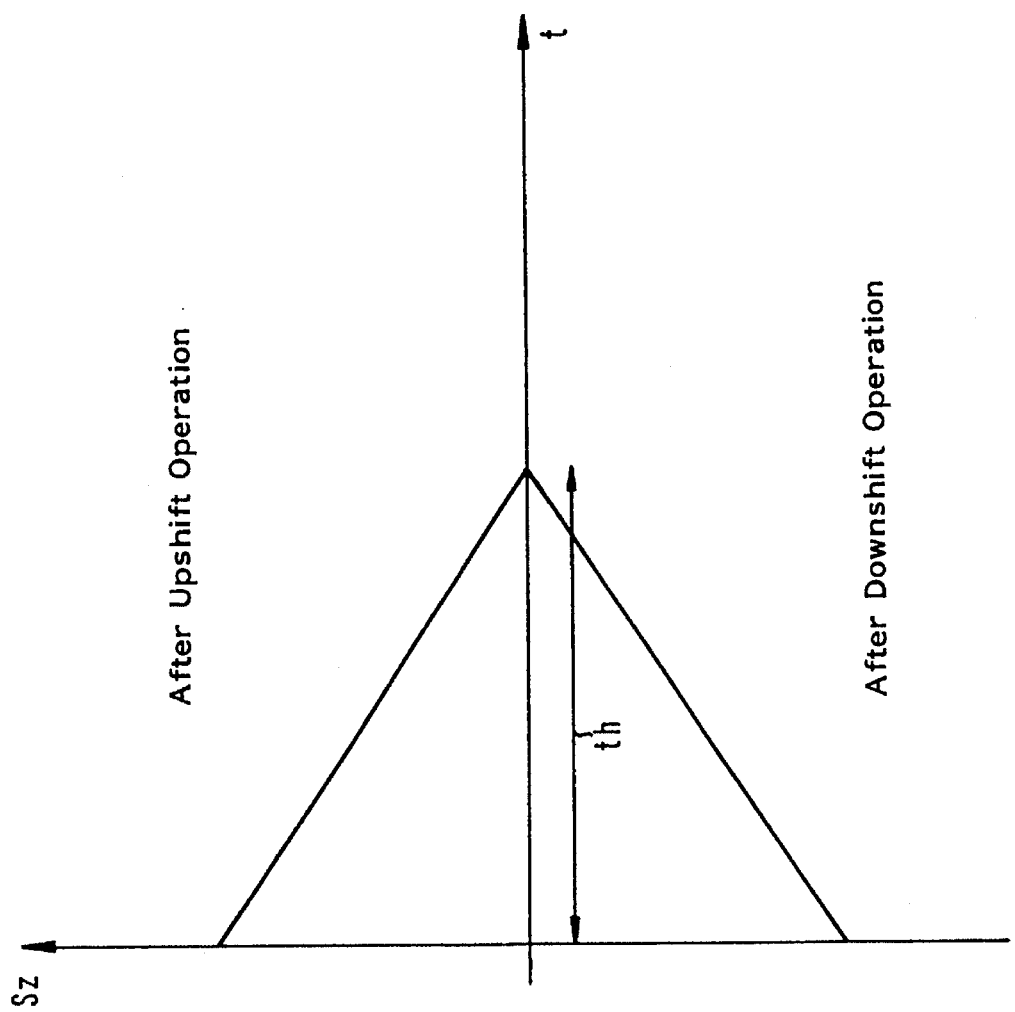
FIG. 3 is a graph showing the time-dependent hysteresis component Sz plotted as a function of time.

The time-dependent hysteresis component Sz(t) is shown in FIG. 3. The quantity Sz assumes its maximum positive value after a completed upshift at time t=0. After a completed downshift operation, the quantity Sz assumes its maximum negative value. The time-dependent hysteresis component Sz reduces to the value zero within a specific hysteresis time th. After the hysteresis time th has elapsed, the basic hysteresis Sh remains as the hysteresis.

Figure 4:
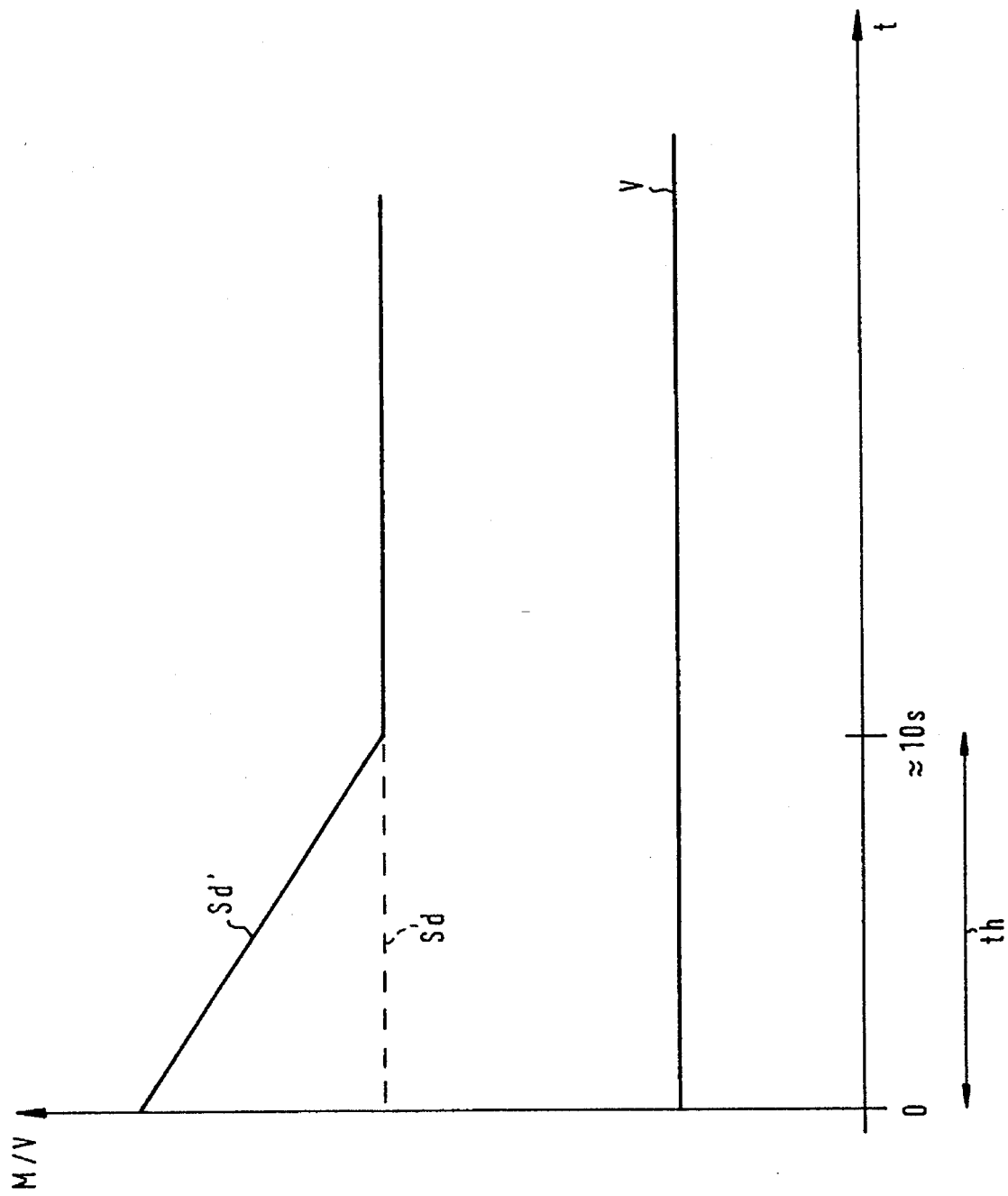
FIG. 4 is a graph showing the downshift threshold Sd as a function of time for a fixed motor vehicle speed V.
Figure 5:
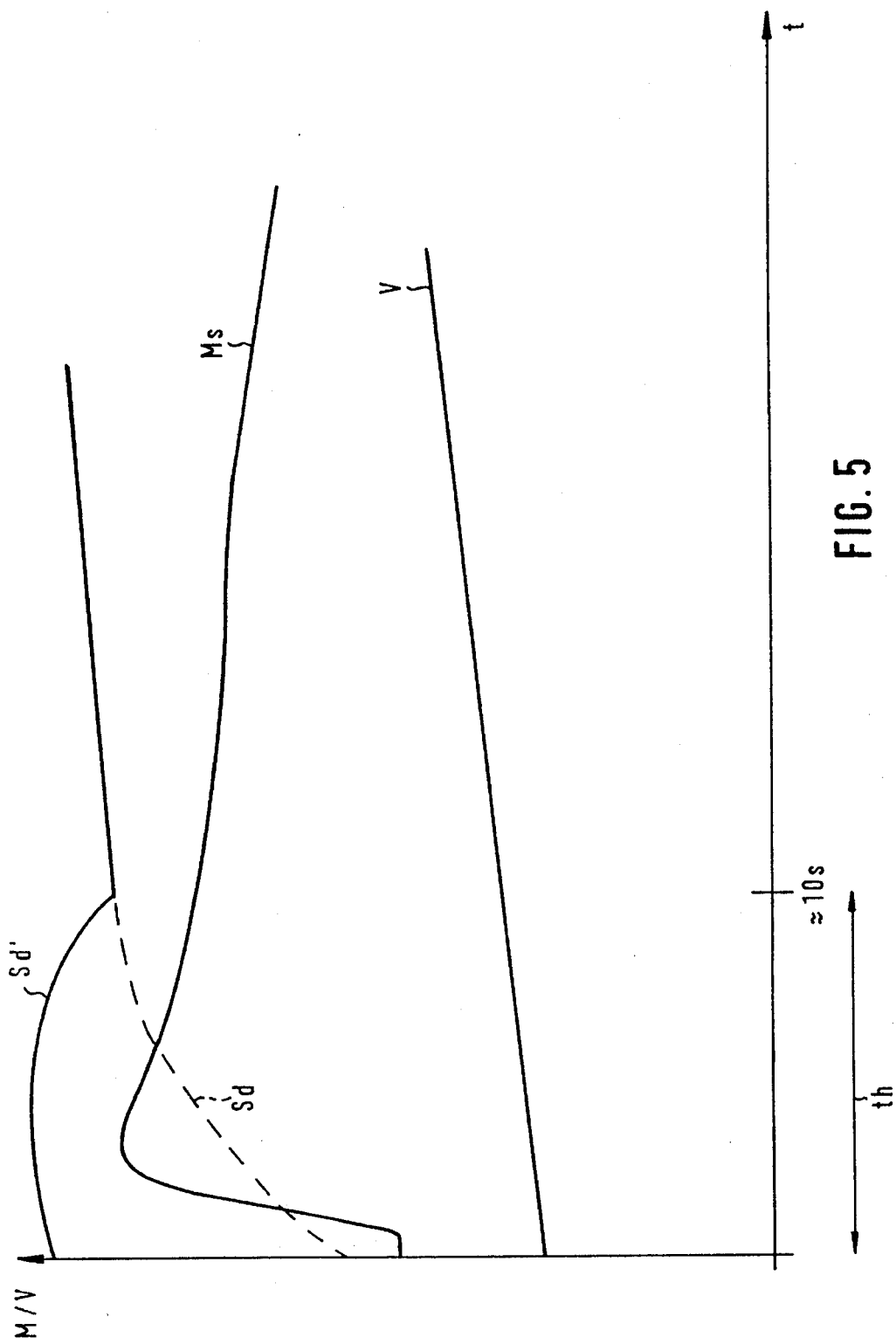
FIG. 5 is a graph showing driver command M plotted as a function of time for a fixed motor vehicle speed V; and, FIG. 6 is a flowchart showing the sequence of steps in the method according to the invention.

FIG. 4 shows the downshift threshold Sd as a function of time for a fixed velocity of the motor vehicle after a completed upshift. The broken line shows the trace without additional hysteresis, whereas the solid line shows the trace with additional hysteresis. FIG. 5 shows that a time-dependent increase of the downshift threshold Sd takes place to the new downshift threshold Sd' within the hysteresis time th because of the time-dependent additional hysteresis.

The time-limited additional hysteresis becomes effective, for example, in the situation explained below.

The driver accelerates with a slightly depressed accelerator pedal from a relatively low speed with the transmission being in the third gear. When the motor vehicle reaches now a certain higher speed, the transmission shifts into the fourth gear. Immediately after the completed three-to-four upshift, the driver depresses the accelerator pedal a little more than previously. This operation is shown in FIG. 5 as an increase of the torque command Ms because of the position of the accelerator pedal. FIG. 5 shows that the torque command Ms is at first so high that it lies above the steady-state torque threshold Sd for a downshift. Without the additional measure provided by the invention, an opposite downshift would therefore be triggered directly after the upshift which, as a rule, is unwanted by the driver. However, the downshift threshold Sd' is so high because of the dynamic additional hysteresis Sz(t) that no downshift takes place. Even though the additional hysteresis drops down to zero within a time interval th of, for example, ten seconds, this, however, nonetheless does not lead to a downshift because the motor vehicle is further accelerated within these ten seconds. With increasing speed V, the steady-state torque threshold Sd for downshifts, however, increases according to the usual characteristic for shift characteristic lines so that, at the time point (t>th), at which the additional hysteresis returns to zero, the downshift threshold Sd or Sd' lies above the torque command Ms of the driver because of the increased speed V of the motor vehicle. Furthermore, the accelerator pedal characteristic lines are usually so applied that the torque requirement for a pregiven pedal position drops with increasing speed or rpm.

The invention will now be explained with respect to FIG. 6 which shows an exemplary sequence diagram with respect to which an embodiment of the method of the invention will be explained.

After a completed shift operation and after the start 601 of the program, the time counter t is set to zero in step 602. An inquiry is then made in step 603 as to whether the shifting operation is an upshift or a downshift operation. In both cases, the following are read in in step 604: the instantaneous driver command Ms, the instantaneous speed V of the motor vehicle and the steady-state hysteresis Sd or Su which had been stored for the completed shift change. The hysteresis Sd was stored in the case wherein an upshift operation had taken place and the hysteresis Su is stored in the case where a downshift operation had taken place. In step 606, the time-dependent hysteresis component Sz is read from a characteristic line of FIG. 3 at the time point t=0. As already explained with respect to FIG. 3, the time-dependent component Sz assumes a positive value after an upshift operation and a negative value after a downshift operation. The comparison of the driver command Ns now takes place to modified threshold values. After an upshift (step a downshift (step 609) takes place only if $$Ms>Sd+Sz$$

For this purpose, the driver must, however, depress the accelerator pedal relatively far. When the driver does do this, it is to be assumed that the driver actually wants a high acceleration and that the downshift is accordingly justified. If, in contrast, the driver depresses the accelerator pedal only a little, then a somewhat reduced acceleration is, as a rule, less disturbing than a pendular downshift because of the downshift which did not take place.

A new upshift (step 610) takes place in a corresponding manner after a downshift only if:

$$Ms<Su+Sz$$

is satisfied. Sz is in this case negative. If the above-mentioned conditions (steps 607 and 608) are not satisfied, then the time counter is incremented by a time step dt (step 605) in order to again determine the time-dependent component Sz from the characteristic curve shown in FIG. 3 after a new read out of the instantaneous driver command Ms, the speed V of the motor vehicle and the threshold Fd or Su (step 604). The amount of the time-dependent hysteresis component Sz is then, according to the invention, less in amount than at time point t=0 as can be seen in FIG. 3.

Figure 6:
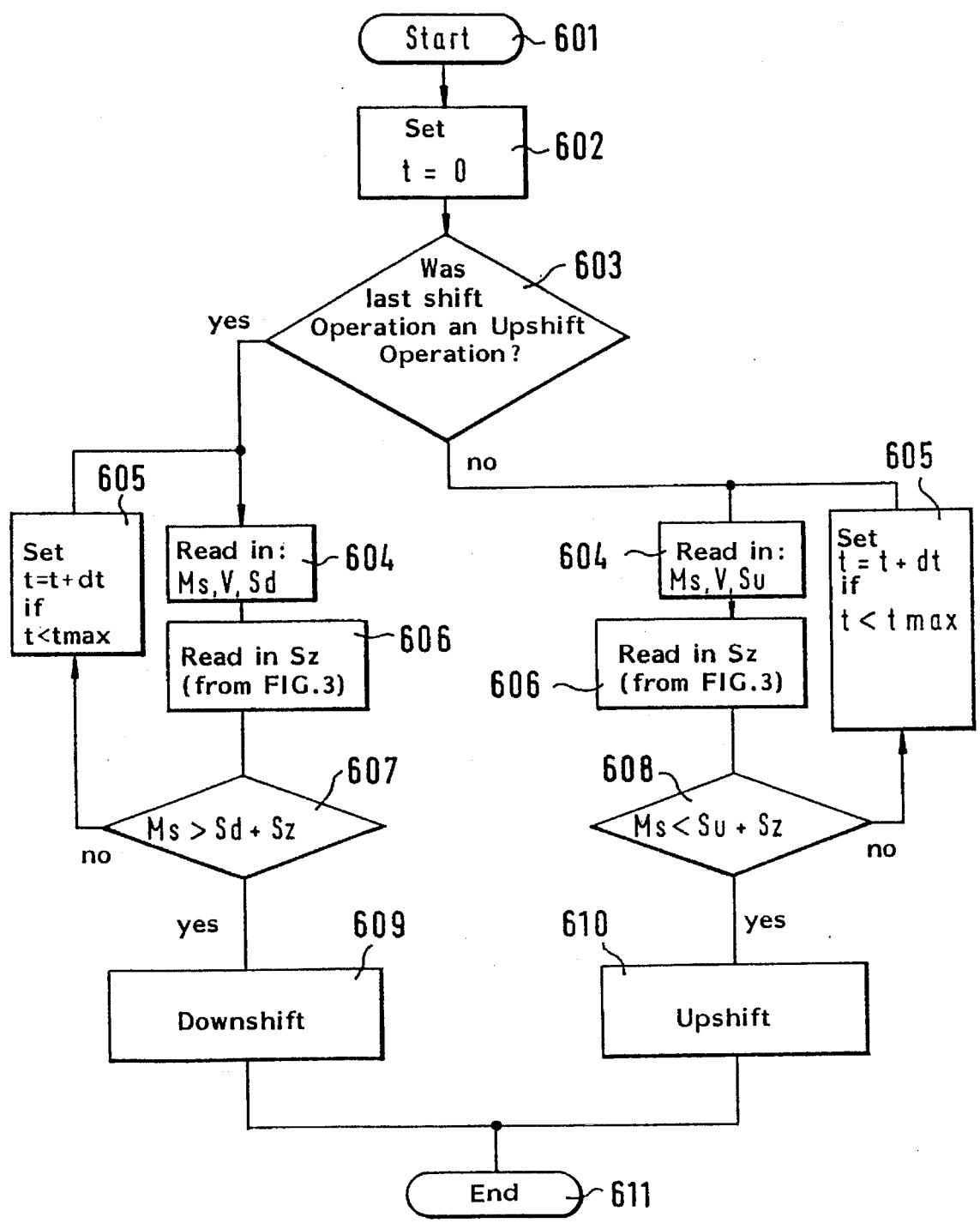

Alternatively, the method described with respect to FIG. 6 can also be realized with a multiplicative factor Sz'. This is then defined as follows:

Sz' has a value greater than 1 at time t=0 after an upshift operation and approaches the value 1 for longer times; and, after downshifting, the time-dependent component Sz' has a value less than 1 at t=0 and likewise approaches 1 for longer times. The conditions shown in steps 607 and 608 then are:

$$Ms > Sd*Sz'$$

$$Ms < Su*Sz'.$$

If a greater time has passed after a shift operation, then the additional short-time hysteresis (Sz or Sz') has decayed and only the steady-state hysteresis Sh is effective, which can be selected to be very small. The gear optimal for consumption can almost always be selected because of the very small steady-state hysteresis Sh.

If, in contrast, the driver changes the accelerator pedal position shortly after a completed shift operation in such a manner that, without this measure, an opposite shift operation would have been triggered, then this would be suppressed in most cases by the additional hysteresis. In this way, frequent pendular shifts which would occur for small hysteresis especially in city traffic are effectively suppressed.

It is understood that the foregoing description is that of the preferred embodiments of the invention and that various changes and modifications may be made thereto without departing from the spirit and scope of the invention as defined in the appended claims.

What is claimed is:

1. A method for actuating an automatic transmission of a motor vehicle, the method comprising the steps of:

triggering upshift and downshift operations for adjusting transmission ratios of said automatic transmission in dependence upon a first signal representing the transmission output rpm (Nab) and/or the engine rpm (Nmot) and/or the transmission input rpm (NE) and a second signal (Ms) representing the command of the driver;

carrying out said upshift and downshift operations with a hysteresis (Sh) typical for the particular upshift and downshift operations; and, providing that said hysteresis (Sh) includes a time-dependent component (Sz(t)).

2. The method of claim 1, wherein said time-dependent component (Sz(t)) increases said hysteresis (Sh) during a pregiven time interval (th) starting with a shift operation, shortly before a shift operation or shortly after a shift operation.

3. The method of claim 2, wherein said increase of said hysteresis (Sh) diminishes within the time interval (th).

4. The method of claim 1, wherein said hysteresis further includes a steady-state component (Su, Sd).

5. The method of claim 4, wherein said time-dependent component (Sz(t)) is additively superposed on said steady-state component (Su, Sd) to form said hysteresis (Sh).

6. The method of claim 4, wherein said time-dependent component (Sz(t)) is multiplicatively superposed on said steady-state component (Su, Sd) to form said hysteresis (Sb).

7. The method of claim 4, wherein said time-dependent component (Sz(t)) is a quantity which diminishes as a function of time within a time interval (th); and, said time interval (th) starts with a shift operation, shortly before a shift operation or shortly after a shift operation.

8. The method of claim 7, wherein said time-dependent component (Sz(t)) assumes the value zero after said time interval (th) has elapsed.

9. The method of claim 1, said second signal (Ms) being defined by:

a position of an accelerator pedal actuated by the driver and/or a throttle flap opening angle of an internal combustion engine of said motor vehicle and/or a torque of said internal combustion engine of said motor vehicle commanded by the driver and/or an output torque at the automatic transmission commanded by the driver.

10. An arrangement for actuating an automatic transmission of a motor vehicle, the arrangement comprising:

means for triggering upshift and downshift operations for adjusting transmission ratios of said automatic transmission in dependence upon a first signal representing the transmission output rpm (Nab) and/or the engine rpm (Nmot) and/or the transmission input rpm (NE) and a second signal (Ms) representing the command of the driver;

said means being adapted to provide said upshift and downshift operations with a hysteresis (Sh) typical for the particular upshift and downshift operations; and, said means being further adapted to provide that said hysteresis (Sh) includes a time-dependent component (Sz(t)).

* * * * *

UNITED STATES PATENT AND TRADEMARK OFFICE
CERTIFICATE OF CORRECTION

PATENT NO. : 5,474,507
DATED : December 12, 1995
INVENTOR(S) : Martin Streib and Hong Zhang It is certified that error appears in the above-indentified patent and that said Letters Patent is hereby corrected as shown below:

In column 1, line 21: delete "read" and substitute -- road -- therefor.

In column 1, line 28: delete "when" and substitute -- then -- therefor.

In column 2, line 6: delete "call" and substitute -- can -- therefor.

In column 2, line 42: delete "DRAWING" and substitute -- DRAWINGS -- therefor.

In column 4, lines 46 and 47: delete "(step a downshift (step 609)" and substitute -- (step 607), a downshift (step 609), -- therefor.

In column 6, line 16: delete "(Sb)" and substitute -- (Sh) -- therefor.

Signed and Sealed this

Sixth Day of August, 1996

Attest:

BRUCE LEHMAN

*Attesting Officer*    *Commissioner of Patents and Trademarks*